(No Model.)
A. STRAUS.
RUBBER TIRE FOR VEHICLES.
No. 449,502. Patented Mar. 31, 1891.
FIG. I.
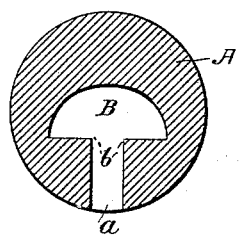
FIG. II.
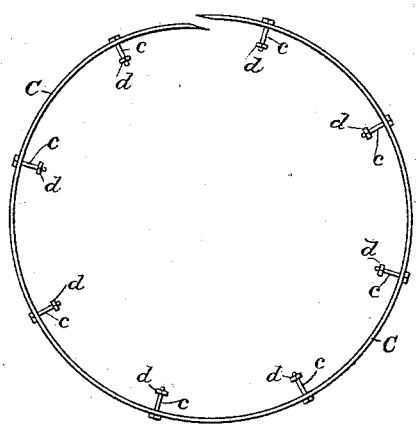
FIG. III.
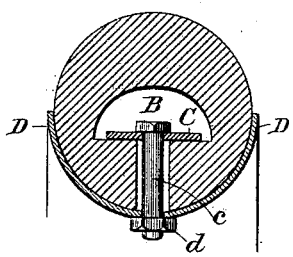
FIG. IV.
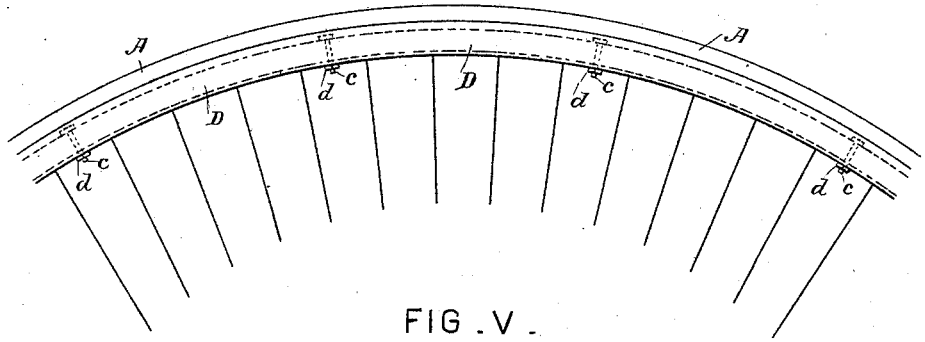
FIG. V.
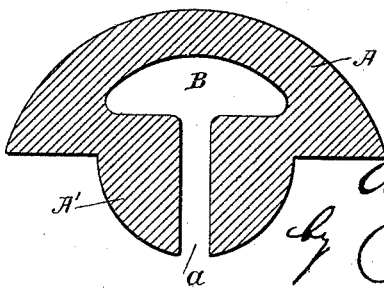
Attest:
Geo. T. Smallwood.
R. L. Hogue.
Inventor
Alexander Straus
by Pollok & Mauro
his attorneys.

UNITED STATES PATENT OFFICE.

ALEXANDER STRAUS, OF NEW YORK, N. Y., ASSIGNOR TO THE NEW YORK BELTING AND PACKING COMPANY, OF SAME PLACE.

RUBBER TIRE FOR VEHICLES.

SPECIFICATION forming part of Letters Patent No. 449,502, dated March 31, 1891.

Application filed October 22, 1890. Serial No. 368,907. (No model.)

*To all whom it may concern:*

Be it known that I, ALEXANDER STRAUS, of New York city, in the county and State of New York, have invented a new and useful Improvement in the Manufacture of Rubber Tires for Vehicles, which improvement is fully set forth in the following specification.

The present invention has reference to the manufacture of rubber tires for bicycles and other vehicles and the application thereof to the wheels of such vehicles.

Heretofore it has been proposed to mold and vulcanize rubber tires of varying shapes in cross-section around a wire, core, or band of metal embedded therein, such wire, core, or band serving as a means for securing the wire to the rim of the wheel with the aid of bolts or staples. This procedure is attended with the objections that arise when two substances having different coefficients of expansion are subjected to high heat and subsequent cooling, and is objectionable for other reasons which need not be specifically pointed out. It has also been proposed to form a tire of a rubber tube, threading a wire through the same and through eyes in the ends of a series of small bolts, which are inserted through holes in the tire. In such case the bore of the tube has been sufficiently large to leave a vacant space after insertion of the wire.

According to the present invention the tire is molded with a longitudinal groove on the side next the rim of the wheel, said groove communicating with an interior chamber or space extending the full length of the tire and being approximately semi-elliptical or semicircular, so as to form square shoulders on each side of the entering groove. These shoulders constitute seats for a holding-band, to which is attached a series of bolts. The whole is then placed on the wheel and the bolts secured thereto and tightened by nuts. The flanges which hold the tire may obviously be on the bolts instead of using a broad band. The hollow space above the holding-band will serve as a cushion, and if the tire be too soft on account thereof a strip of leather or other material more or less compressible may be inserted therein. For large tires from one to two inches in diameter it is preferred to make the main portion of the tire of semicircular shape in cross-section with a central projection on the under side, also semicircular in cross-section, but of smaller diameter than the main portion of the tire.

The accompanying drawings will illustrate the invention.

Figure I is a cross-section of the rubber tire; Fig. II, a view of the holding-band; Fig. III, a view similar to Fig. I, showing the tire secured to the rim of a wheel; Fig. IV, a partial side view of the wheel, and Fig. V a cross-section showing the shape of the large tire.

The tire A, Fig. I, is molded with an opening or groove $a$, extending lengthwise thereof and of proper width for the passage of the holding-bolts. This groove extends inward to the longitudinal space B in the interior of the tire, the space B being curved on top and flat on the bottom, forming with the groove $a$ the shoulders $b$.

The holding-band C, Fig. II, is made of sufficient width to extend across the groove $a$, as shown in Fig. III. It is provided at suitable intervals with bolts $c$, and the band being cut to proper length is threaded with its bolts attached through the channel B in the tire A. The tire is now applied to the rim D of the wheel, the bolts $c$ passing through holes pierced therein and tightened by means of nuts $d$. This mode of constructing and securing the tire is simple, expeditious, and effective. The space in the tire above the band is advantageous in serving as a cushion.

In Fig. V is shown the special construction devised for tires of large diameter. Instead of being cylindrical, the main portion A is a segment of a circle, approximately a semicircle in cross-section. It is provided on the under side with a central semicircular projection or rib A' of smaller diameter. The external outline thus conforms somewhat to the shape of the interior groove and channel, saving weight and material, without impairing the durability of the tire. The tire is attached to the wheel in the manner already described.

I claim as my invention—

1. The described method of constructing rubber tires and attaching the same to the rims of wheels, said method consisting in molding the tire with an interior space or channel having a flat bottom, and a groove communicating with the said space or channel, inserting a holding-band with attached bolts into said channel, so that the bolts project through the groove and the band rests on the bottom of said channel and securing said bolts to the rim of the wheel, as set forth.

2. A rubber tire having an interior space of approximately semi-elliptical shape in cross-section, and a longitudinal groove extending from the straight side or bottom of said space or channel to the inner surface of the tire, substantially as described.

3. The combination of the tire formed with an interior space or channel and a longitudinal groove extending from the same to the inner surface of the tire, the holding-band inserted in the said space or channel, and the bolts attached to said band, the said channel being of sufficient size to leave a space above the band for the purpose of cushioning, substantially as described.

4. A rubber tire having the shape in cross-section of a segment of a circle with a semi-circular depression or rib of smaller diameter on the under side, said tire being provided with an interior channel and a groove extending through the depression or rib to said channel, substantially as described.

In testimony whereof I have signed this specification in the presence of two subscribing witnesses.

ALEXANDER STRAUS.

Witnesses:
VICTOR E. BURKE,
R. P. CORNWELL.